US009529595B2

(12) United States Patent
Lin

(10) Patent No.: US 9,529,595 B2
(45) Date of Patent: Dec. 27, 2016

(54) BRANCH PROCESSING METHOD AND SYSTEM

(71) Applicant: Shanghai XinHao Micro Electronics Co. Ltd., Shanghai (CN)

(72) Inventor: Kenneth Chenghao Lin, Shanghai (CN)

(73) Assignee: SHANGHAI XINHAO MICROELECTRONICS CO. LTD., Shanghai (CN)

( * ) Notice: Subject to any disclaimer, the term of this patent is extended or adjusted under 35 U.S.C. 154(b) by 0 days.

(21) Appl. No.: 14/443,393

(22) PCT Filed: Nov. 22, 2013

(86) PCT No.: PCT/CN2013/087723
§ 371 (c)(1),
(2) Date: May 18, 2015

(87) PCT Pub. No.: WO2014/079389
PCT Pub. Date: May 30, 2014

(65) Prior Publication Data
US 2015/0339125 A1 Nov. 26, 2015

(30) Foreign Application Priority Data
Nov. 26, 2012 (CN) .......................... 2012 1 0508931

(51) Int. Cl.
G06F 9/30 (2006.01)
G06F 9/38 (2006.01)
G06F 12/08 (2016.01)

(52) U.S. Cl.
CPC ......... *G06F 9/3806* (2013.01); *G06F 9/30054* (2013.01); *G06F 9/30058* (2013.01);
(Continued)

(58) Field of Classification Search
CPC ................................................ G06F 3/00–3/18
See application file for complete search history.

(56) References Cited

U.S. PATENT DOCUMENTS

| 5,542,109 A | 7/1996 | Blomgren et al. |
| 5,860,017 A | 1/1999 | Sharangpani et al. |
| 6,912,650 B2 * | 6/2005 | Ukai ..................... G06F 9/3804 712/207 |

FOREIGN PATENT DOCUMENTS

| CN | 1349160 A | 5/2002 |
| CN | 102117198 A | 7/2011 |

OTHER PUBLICATIONS

The World Intellectual Property Organization (WIPO) International Search Report for PCT/CN2013/087723 Mar. 6, 2014.

* cited by examiner

*Primary Examiner* — Cheng-Yuan Tseng
(74) *Attorney, Agent, or Firm* — Anova Law Group, PLLC

(57) ABSTRACT

A method for branch processing is provided. The method includes determining an instruction type of an instruction written into a cache memory and recording the instruction type. The method also includes calculating a branch target instruction address of the branch instruction and recording target address information corresponding to the branch target instruction address when the instruction is a branch instruction, where the target address information corresponds to one instruction segment containing at least the branch target instruction. Further, the method includes filling the instruction segment containing at least the branch target instruction into the position corresponding to the target address information in the cache memory based on the branch target instruction address when the branch target instruction is not stored in the cache memory, such that (Continued)

before a CPU core executes the branch instruction, a next instruction following the branch instruction in a program sequence and the branch target instruction of the branch instruction are stored in the cache memory.

28 Claims, 4 Drawing Sheets

(52) U.S. Cl.
CPC .......... *G06F 9/3804* (2013.01); *G06F 9/3808* (2013.01); *G06F 12/0875* (2013.01); *G06F 2212/452* (2013.01)

| TYPE | Valid | BNX | BNY |
|---|---|---|---|
| non-branch | 0 | xxx | xxx |
| conditional direct branch | 0 | xxx | xxx |
| conditional direct branch | 1 | BNX | BNY |
| unconditional direct branch | 0 | xxx | xxx |
| unconditional direct branch | 1 | BNX | BNY |
| conditional indirect branch | 0 | xxx | xxx |
| conditional indirect branch | 1 | BNX | BNY |
| unconditional indirect branch | 0 | xxx | xxx |
| unconditional indirect branch | 1 | BNX | BNY |

BRANCH PROCESSING METHOD AND SYSTEM

TECHNICAL FIELD

The present invention generally relates to computer architecture and, more particularly, to the methods and systems for branch processing.

BACKGROUND ART

A control hazard, also called branching, is a significant factor in losing efficiency of processor pipelining. When processing branch instructions, conventional processors often do not know where to fetch the next instruction after a branch instruction and may have to wait until the branch instruction finishes, leaving the pipeline behind the branch instruction empty. FIG. 1 shows a conventional pipelining structure, and Table 1 shows pipeline stages with respect to a branch instruction.

TABLE 1 Pipeline stages with a branch instruction (branch taken)

TABLE 1

| Sequence | | | | | | | |
|---|---|---|---|---|---|---|---|
| i | IF | ID | EX | MEM | | | |
| i + 1 | | IF | stall | stall | stall | | |
| target | | | IF | ID | EX | MEM | |
| target + 1 | | | | IF | ID | EX | |
| target + 2 | | | | | IF | ID | |
| Instr. Addr. | i | i + 1 | target | target + 1 | target + 2 | target + 3 | target + 4 |
| Instr. Fetched | | i | i + 1 | target | target + 1 | target + 2 | target + 3 |
| Clock cycles | 1 | 2 | 3 | 4 | 5 | 6 | 7 |

Considering FIG. 1 and Table 1 together, columns in table 1 represent clock cycles in the pipeline, and rows represent instructions in sequence. Instruction address (Inst. Addr.) is the address provided to an instruction memory for fetching instructions, and the output of the instruction memory is then provided to a decoder for decoding the fetched instruction. The pipeline includes instruction fetch (IF), instruction decode (ID), execution (EX), memory access (MEM), and write back (WB). Stall means the pipeline is stopped or empty.

Table 1 shows a branch instruction, as indicated by 'i', being fetched at clock cycle '1'. Further, 'i+1' indicates the instruction following the branch instruction, 'target' indicates a branch target instruction of the branch point, and 'target+1', 'target+2', 'target+3', and 'target+4' indicate instructions following the branch target instruction in sequence.

As shown in Table 1, at clock cycle '2', the processor fetches the branch instruction 'i'. At clock cycle '3', the processor fetches instruction 'i+1', and decodes the branch instruction 'i'. Assuming at the end of the decoding stage of the branch instruction, the branch target address is calculated and the branch decision is made. If the branch decision is that of taking the branch then the branch target address is saved as the next address used to fetch the next instruction. At clock cycle '4', the branch target address is fetched and subsequently decoded and executed. From here on, the pipeline processes instructions following the branch target instruction. However, in this scenario, the already-fetched instruction following the branch instruction 'i+1' should not be executed, therefore the pipeline stalls in relate to the 'i+1' instruction. Thus, under this branch taken successfully scenario, one clock cycle stall is introduced to the pipeline, which may cause significant performance decrease in pipeline operation.

DISCLOSURE OF INVENTION

Technical Problem

To reduce the impact on the pipeline efficiency from the branch processing, many static or dynamic branch prediction methods have been developed, such as delay slot, branch prediction buffer, branch target buffer, and trace cache, etc. However, these prediction methods generally make predictions based on previous results of the processor and thus may still suffer from loss of efficiency caused by wrong predictions. In additional, in conventional processor systems, cache miss caused by a branch instruction can also lead to performance loss.

Solution to Problem

Technical Solution

The disclosed method and system are directed to solve one or more problems set forth above and other problems.

One aspect of the present disclosure includes a branch processing method. The method includes determining instruction type of an instruction written into a cache memory and recording the instruction type. The method also includes calculating a branch target instruction address of the branch instruction and recording target address information corresponding to the branch target instruction address when the instruction is a branch instruction, where the target address information corresponds to one instruction segment containing at least the branch target instruction. Further, the method includes filling the instruction segment containing at least the branch target instruction into the position corresponding to the target address information in the cache memory based on the branch target instruction address when the branch target instruction is not stored in the cache memory, such that before a CPU core executes the branch instruction, a next instruction following the branch instruction in a program sequence and the branch target instruction of the branch instruction are stored in the cache memory.

Another aspect of the present disclosure includes a branch processing system. The system includes a scanner configured to determine instruction type of an instruction written into a cache memory and calculate a branch target instruction address of the branch instruction. The system also includes an active list configured to convert the branch target instruction address to the target address information and a track table configured to record the instruction type and the target address information corresponding to the instruction written into the cache memory. Further, the system includes filling the instruction segment containing at least the branch target instruction into the position corresponding to the target address information in the cache memory when the branch target instruction is not stored in the cache memory, based on the branch target instruction address, such that before a CPU core executes the branch instruction, a next instruction following the branch instruction in a program sequence and the branch target instruction of the branch instruction are stored in the cache memory.

Other aspects of the present disclosure can be understood by those skilled in the art in light of the description, the claims, and the drawings of the present disclosure.

Advantageous Effects of Invention

Advantageous Effects

The disclosed systems and methods may provide fundamental solutions to processing branch instructions for pipelined processors. The disclosed systems and methods obtain addresses of branch target instructions in advance of execution of corresponding branch points and use various branch decision logic arrangements to eliminate the efficiency loss due to incorrectly predicted branch decisions. Other advantages and applications are obvious to those skilled in the art.

BRIEF DESCRIPTION OF DRAWINGS

Description of Drawings

Figure 1:
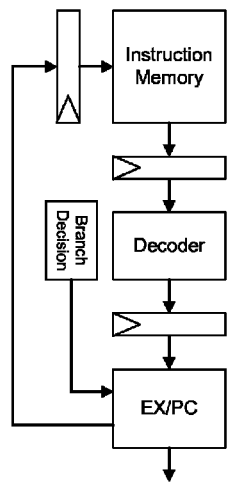
Figure 2:
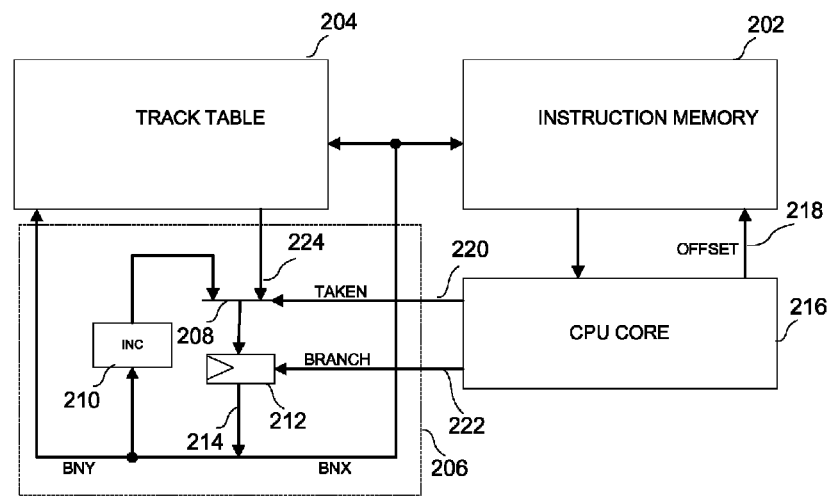
Figures 3, 4:
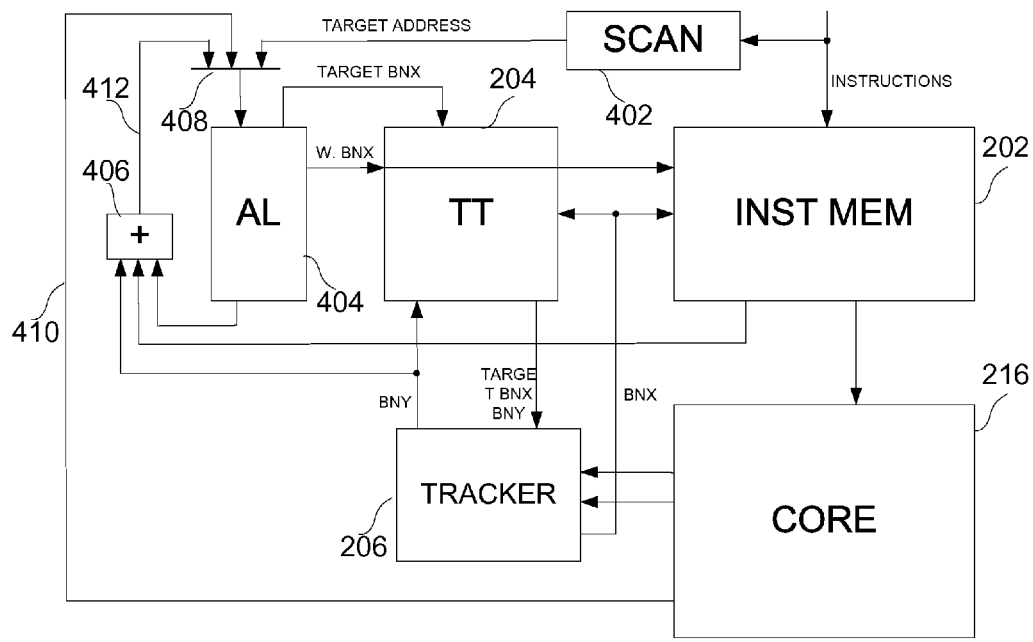
Figure 5A:
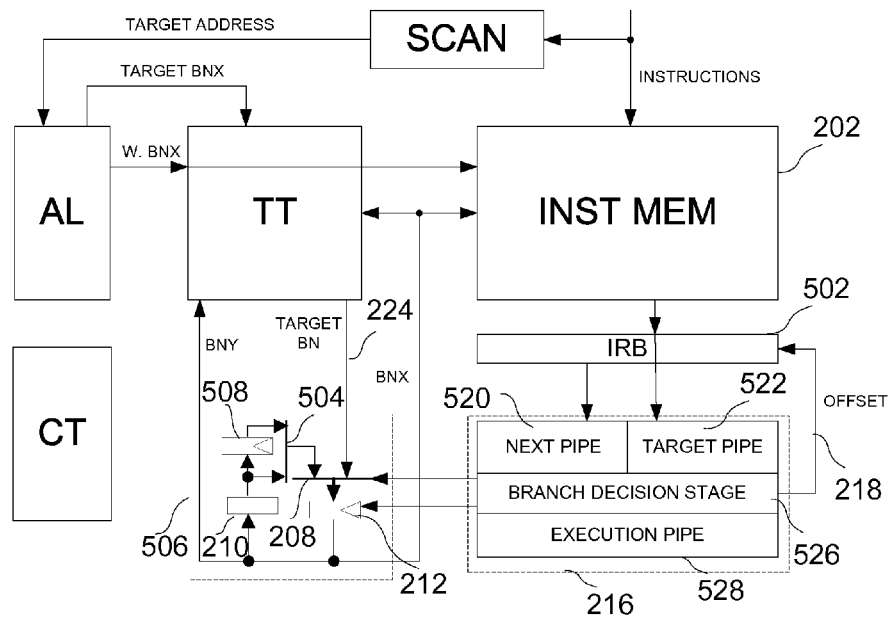
Figure 5B:
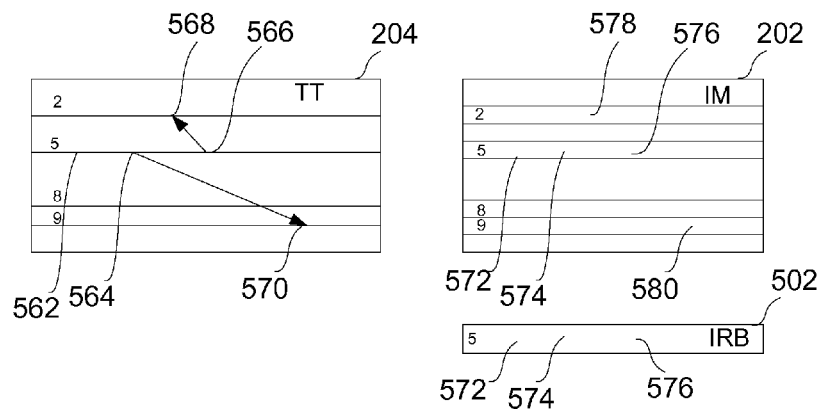
Figure 6:
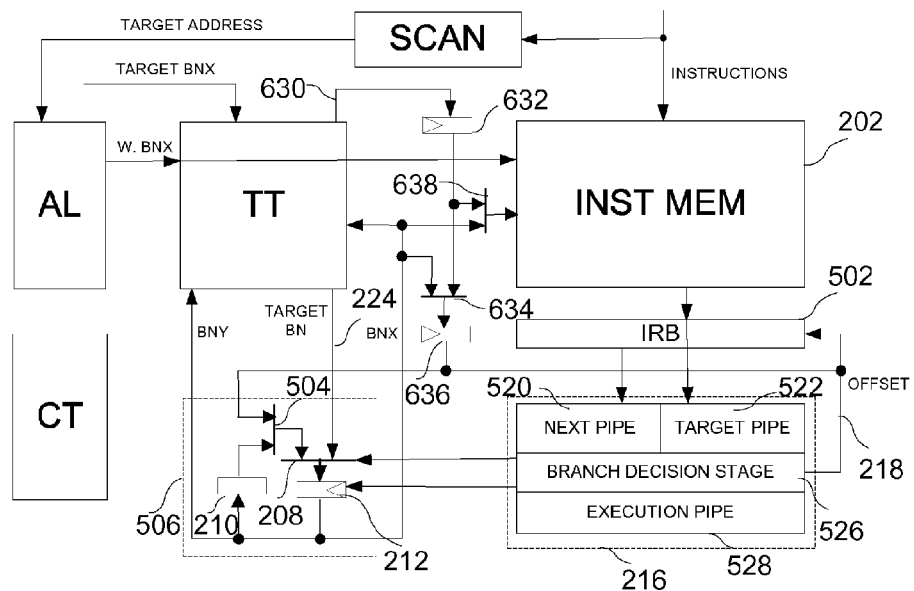
Figures 7A, 7B:
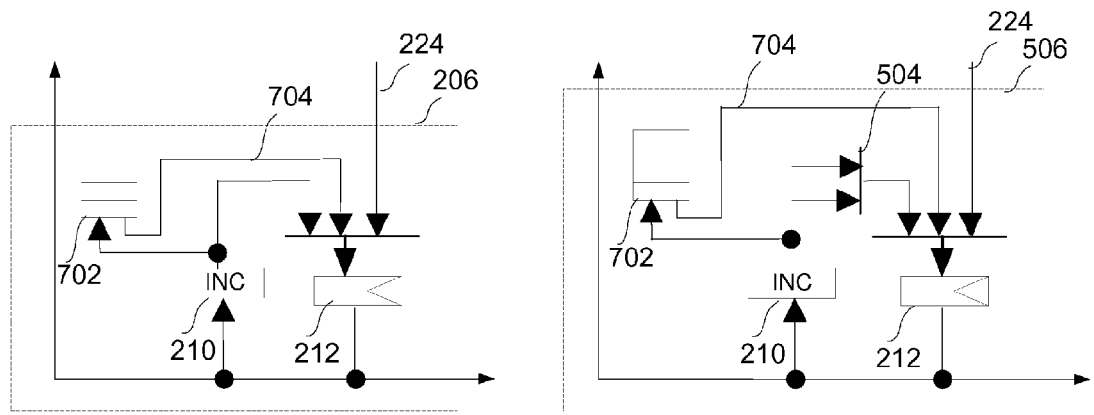

FIG. 1 illustrates a conventional pipeline control structure;

FIG. 2 illustrates an exemplary cache memory based on a track table consistent with the disclosed embodiments;

FIG. 3 illustrates an exemplary table entry type of track table consistent with the disclosed embodiments;

FIG. 4 illustrates another exemplary cache memory based on a track table consistent with the disclosed embodiments;

FIG. 5A illustrates an exemplary branch processing system consistent with the disclosed embodiments;

FIG. 5B illustrates an exemplary branch processing system operation consistent with the disclosed embodiments;

FIG. 6 illustrates another exemplary branch processing system consistent with the disclosed embodiments;

FIG. 7A illustrates an exemplary tracker consistent with disclosed embodiments; and FIG. 7B illustrates another exemplary tracker consistent with disclosed embodiments.

BEST MODE FOR CARRYING OUT THE INVENTION

Best Mode

FIG. 6 illustrates an exemplary preferred embodiment(s).

MODE FOR THE INVENTION

Mode for Invention

Reference will now be made in detail to exemplary embodiments of the invention, which are illustrated in the accompanying drawings.

FIG. 2 shows an exemplary cache memory based on a track table consistent with the disclosed embodiments. It is understood that the various components are listed for illustrative purposes, other components may be included and certain components may be combined or omitted. The various components may be distributed over multiple systems, may be physical or virtual, and may be implemented in hardware (e.g., integrated circuitry), software, or a combination of hardware and software.

As shown in FIG. 2, track table 204 and tracker 206 may interact with each other for providing various addresses for cache and branching processing. The track table system may also include a CPU core 216. CPU core 216 may include any appropriate processor capable of operating in a pipeline mode and with cache systems. Further, CPU core 216 can include multiple cores for multi-thread or parallel processing.

The track table system may also include an instruction memory 202 that is addressed by Block Number and block offset. Instruction memory 202 may include any appropriate memory devices, such as static random-access memory (SRAM), dynamic random-access memory (DRAM) and flash memory. Instruction memory 202 may act as a cache for the system or a level one cache, if other caches exist, and may be separated into a plurality memory segments called blocks (e.g., memory blocks) for storing data (i.e., both instructions and data in instruction blocks and data blocks) to be accessed by CPU core 216. For example, instruction memory 202 may include X memory blocks, and each memory block may include Y instructions. BNX, a memory block number by mapping a block address of instruction memory, is used to select one corresponding memory block. BNY, an offset within a memory block, is used to select one corresponding instruction of the memory block.

Track table 204 is configured to store the inner logic of computer program. Track table 204 may be configured as a two dimensional table with X number of rows and Y number of columns, in which each row, addressable by first address BNX, is corresponding to one memory block or memory line, and each column, addressable by second address BNY, is corresponding to the offset of the corresponding instruction within memory blocks. Each row of the track table 204 forms a track. The tracks in track table 204 and memory blocks in instruction memory 202 may be one to one corresponded. As used herein, a track may refer to a representation of a series of instructions (e.g., an instruction block) to be executed. The representation may include any appropriate type of data, such as addresses, block numbers, or other numbers. Further, a new track may be created when a track includes a branch point with a branch target which changes program flow or with an instruction followed by another instruction from a different instruction block, such as an instruction from a next instruction block, an exception program, or a different program thread, etc.

The entries (e.g. memory cell) in the tracks and instructions in the corresponding memory blocks may be one to one corresponded and may be addressed by a pair of BNX and BNY. One entry (also called table entry) in the track table corresponding to a single branch instruction (i.e., branch source) stores one mapped branch target instruction address (i.e., branch target). Further, each entry or track point in the row may have a content format including a type, a BNX, and a BNY. As used herein, a type refers to an instruction type of an instruction corresponding to the entry. BNX and BNY represent an addressing address corresponding to a branch target in the track table and also represent an addressing address corresponding to the branch target instruction in the instruction memory. When BNX is used for addressing the branch target point in the track table, BNX may be called track number. When BNX is used for addressing the branch target point in the instruction memory, BNX may be called memory block number. Further, the content format of each entry may include a valid bit. The valid bit represents whether the BNX and BNY stored in the entry are valid.

When a new track including a branch point (a branch track point) is to be created, the new track may be created at an available row of track table 204 and the branch track point may be created at an available entry of the row. The positions of the row and entry are determined by the source address (i.e., the branch source address) of the branch point, that is, BNX corresponds to the instruction block containing the branch source and BNY corresponds to the branch source in the instruction block. For example, BNX may be determined based on the block address of the branch source address, and BNY may be determined based on the offset address of the branch source address. Thus, the position of the entry can be determined.

Further, the content of the entry in the track table may correspond to the position of the branch target in the track table. In other words, the content of the entry of the branch source stores the branch target address information. For example, the row number or block number of a particular row in track table 204 corresponding to the branch target instruction is stored as BNX in the content of the entry of the branch source (the branch track point). Further, an offset address represents the position of the branch target instruction in the track, and the offset is then stored as BNY in the content of the entry of the branch source (the branch track point). That is, in the content of the entry of the branch source (the content of a branch point), BNX is used as a row address and BNY is used as a column address for addressing the branch target entry of the branch source in the track table 204 and the branch target instruction of the branch source in instruction memory 202. Thus, the entry of the track table may connect the branch source to the branch target.

Track table 204 and tracker 206 may interact with each other as part of the cache system, providing various addresses for cache and branching processing. Tracker 206 may determine a next track to be executed by CPU core based on content of the branch source entry of the current track from track table 204, instruction type, and/or whether a branch is taken by CPU core 216, etc. Tracker 206 may include a selector 208, an incrementer 210, a register 212, and a decoder (not shown in FIG. 2). The decoder decodes instruction type to determine program flow, that is, a next track to be executed by CPU core.

The output of register 212 (i.e. read pointer 214) is used to perform an addressing operation in track table 204 and instruction memory 202.

Branch target address is from an entry of track table 204, that is, the content of the entry. The content of the entry is the BNX and BNY of corresponding branch target instruction of the entry or the branch track point. Thus, the BNX and BNY may be used as indices to find a corresponding branch target instruction.

Read pointer 214 may be in the format of BNX and BNY. At any time, a memory block of instruction memory 202 is pointed by the BNY part of read pointer 214. Based on block offset 218 of the program counter (PC) provided by CPU core 216, read pointer 214 may timely fetch instructions within the memory block for CPU core 216.

At the same time, a corresponding track in the track table 204 is also pointed by the BNX part of read pointer 214. Based on the BNX part of read pointer 214, read pointer 214 may select an entry from the track. Thus, the content of the entry is read out and sent to tracker 206 via bus 224. The content of the entry may be checked to indicate the type of instruction information and address information, etc. Based on the content of the entry, tracker 206 may control the flow of read pointer 214 based on instruction type and a control signal from CPU core 216.

FIG. 3 illustrates an exemplary table entry type of track table consistent with the disclosed embodiments. There may be 5 types of instructions. TYPE 1 (302) is a non-branch instruction (e.g. load, store, etc.). TYPE 2 (304) is a conditional direct branch instruction. TYPE 3 (306) is an unconditional direct branch instruction. TYPE 4 (308) is a conditional indirect branch instruction. TYPE 5 (310) is an unconditional indirect branch instruction.

A direct branch instruction is a branch instruction that calculates a branch target address based on a branch source address and a branch offset of a branch source instruction. An indirect branch instruction (also known as a computed jump, indirect jump or register-indirect jump) is a branch instruction that calculates a branch target address based on other register values in addition to a branch source address and a branch offset of a branch source instruction. A conditional branch instruction is a branch instruction that determines whether a branch is taken based on a result that CPU core 216 executes a branch source. An unconditional branch instruction (or jump) may be treated as a special case of conditional branch instruction, with the condition forced to true.

The subsequent instruction of an instruction TYPE 1 (302) is always the next instruction executed in order. The subsequent instruction of an instruction TYPE 3 (306) or TYPE 5 (310) is always pointed by a branch target address included in the entry. A decoder decodes the fetched instructions and also prepares operands for operation. When the decoder decodes that type is TYPE 1 (302), TYPE 3 (306) or TYPE 5 (310), tracker 206 updates read pointer 214 by itself.

For an instruction TYPE 2 (304) or TYPE 4 (308), tracker 206 does not update read pointer 214 by itself. Instead, tracker 206 waits a signal from CPU core 216 to control flow of computer program.

If instruction type of an entry is TYPE 1 (302), then a valid bit of the entry is invalid (e.g., '0'), and BNX and BNY is any value.

If instruction type of an entry is a direct branch instruction TYPE 2 (304), TYPE 3 (306), TYPE 4 (308) or TYPE 5 (310), then a valid bit of the entry is valid (e.g., '1') or invalid (e.g., '0') based on validity of BNX and BNY of the entry. If instruction type of an entry is TYPE 2 (304) or TYPE 3 (306), when a valid bit of the entry is valid (e.g., '1'), BNX and BNY of the entry is an addressing address (including BNX and BNY) of the branch target corresponding to the branch source in the track table 204; when a valid bit of the entry is invalid (e.g., '0'), BNX and BNY of the entry may be any value.

If instruction type of an entry is an indirect branch instruction TYPE 4 (308) or TYPE 5 (310), when a valid bit of the entry is valid (e.g., '1'), BNX and BNY of the entry is a possible addressing address (including BNX and BNY) of the branch target corresponding to the branch source in the track table 204. After CPU core 216 calculates and obtains an actual branch target address, CPU core 216 compares a block address corresponding to BNX of the possible addressing address with a block address of an actual branch target address. If the comparison result is not equal and a branch is taken, CPU core 216 uses the calculated and obtained actual branch target address as the subsequent instruction address of the branch source. When a valid bit of the entry is invalid (e.g., '0'), BNX and BNY of the entry may be any value.

Returning to FIG. 2, read pointer 214 runs faster than PC. Read pointer 214 moves along a track stops with BNX and BNY of the entry point (source BNX and source BNY). Tracker 206 may perform several different read pointer update based on the content, For example, if the decoder decodes that the instruction type is a non-branch instruction TYPE 1 (302), control selector 208 updates read pointer 214 as $BNX_{next}=BNX_{source}$, and $BNY_{next}=(BNY_{source}+1)$ provided by incrementer 210. Read pointer 214 moves along the same track. At this time, BNX of read pointer 214 may point to the same track and the same memory block corresponding to the new track. Block offset of PC generated by CPU core 216 fetches instructions from the memory block according to the needs.

If the decoder decodes that the instruction type is an unconditional branch instruction TYPE 3 (306) or TYPE 5 (310), control selector 208 updates read pointer 214 as $BNX_{next}=BNX_{target}$, and $BNY_{next}=BNY_{target}$ via bus 224. At this time, read pointer 214 may point to an entry of a new track in the track table. After reaching a branch point, tracker 206 may use the read pointer to obtain a next branch point to continue branch processing, as previously explained. BNX of read pointer 214 may point to a new track and a new memory block corresponding to the new track. Block offset of PC generated by CPU core 216 fetches instructions from the new memory block according to the needs.

Read pointer 214 moves along a track and stops to continue branch processing, as previously explained. If the decoder decodes that an instruction type is a conditional branch TYPE 2 (304) or TYPE 4 (308), read pointer 214 stops and waits for a control signal (TAKEN) provided by CPU core 216. If the branch determination mechanism of CPU core 216 determines that the branch is not taken, CPU core 216 sends TAKEN signal 220 indicating whether the branch is taken '0' to control selector 208 to select $BNX_{next}=BNX_{source}$, and $BNY_{next}=(BNY_{source}+1)$ provided by incrementer 210. Branch signal 222 indicating whether the current instruction is a branch source from CPU core 216 controls read point 212 to update read pointer 214, such that read pointer 214 points to the position of the next instruction. Branch signal 222 indicates a valid time point of taken signal 220. That is, register 208 is updated at the time point, which is similar with the case that the decoder decodes an instruction TYPE 1 (302). Thus, block offset of PC generated by CPU core 216 fetches instructions from the memory block (i.e., source memory block) pointed by BNX of read pointer 214 according to the needs.

However, if the branch determination mechanism of CPU core 216 determines that the branch is taken, a control signal 220 '1' controls selector 208 to select $BNX_{next}=BNX_{target}$, and $BNY_{next}=BNY_{target}$ provided by track table 204 via bus 224. Branch signal 222 controls register 212 to update read pointer 214, such that read pointer 214 points to the position of the branch target instruction of the branch source. This case is similar to the case that the decoder decodes an instruction TYPE 2 (304). Thus, read pointer 214 points to an entry of a new track in the track table. Read pointer 214 moves along a track and stops to continue branch processing from this point, as previously explained. At the same time, read pointer 214 may point to a new memory block in instruction memory 202 to meet the needs of CPU core.

The memory blocks of the two instruction blocks having adjacent addressees may be not adjacent in instruction memory 202. Therefore, a particular end entry is added next to last entry of each track. The entry contains one TYPE 3 representing unconditional direct branch instruction and one BNX. The BNX is a track number by mapping next memory block of the current memory block in order of instructions. The BNY of the entry is set to '0' to indict the first entry of the track. Thus, after CPU core 216 fetches the last instruction of one memory block, CPU core 216 may fetch the instruction next to the last instruction.

In the implementation, the track table 204 can be compressed by storing only branch sources correspond to instructions of TYPE 2, TYPE 3, TYPE 4 and TYPE 5 to save space and increase movement speed of read pointer. To achieve this optimization, TYPE 1 entry is not included.

According to the different architecture of processor instruction set, some processor instructions do not includes all five instruction types, but only contains at least one of five instruction types. In this case, corresponding operations can be performed according operations described above, which are not repeated herein.

FIG. 4 illustrates another exemplary cache memory based on a track table consistent with the disclosed embodiments. The cache memory includes an instruction memory 202, a scanner 402, an active list 404, a track table 204, a tracker 206, an adder 406, a selector 408, and a CPU core 216.

The scanner 402, the active list 404, the track table 204, the tracker 206, the adder 406 and the selector 408 may be used to fill instructions to be executed by CPU core 216 into instruction memory 202. Thus, CPU core 216 fetches the needed instructions from instruction memory 202 in a very low cache miss rate.

The scanner 402 may examine every instruction filled into instruction memory 202 and extract certain information of the instruction, such as instruction type, instruction address, and branch target information of a branch instruction. The instruction and extracted information including branch target information are used to calculate an address and send the address to other modules, such as the active list 404 and the track table 204. For example, the branch target address may be calculated by adding the branch offset to the branch source address. If an instruction block corresponding to the branch target information has not been filled into instruction memory 202, when the instruction block is filled into instruction memory 202, a corresponding track is created in the track table 204.

Active list 104 may store information of any established track, and create a mapping between an instruction block address and a block number, such that tracks can use any available rows in track table 204. For example, when creating a track, branch target address information of branch source is stored in active list 404. The active list 404 may be a mapping table with X*1 entries. Every entry corresponds to one track of the track table, as well as one memory block of the instruction memory. There is one common BNX among the entry, the track, and the memory block. BNX points to the corresponding instruction block address having a mapping relation in every entry. There may be two searching methods for the active list. A corresponding block number may be obtained by mapping one input block address. On the other hand, an instruction block address in the entry addressed by the block number is read out by inputting one block number. During examining process, the BNX of a branch target address may be obtained by a content matching between the address and the entries of active list 404. The matched result, i.e., BNX, may then be used, together with an offset of the instruction in the track, to determine a position of an entry in the track table according to the previous description.

On the other hand, if a match is not found, it means that a track corresponding to the address has not been established. Then, a BNX is assigned by active list 404 and the instruction block corresponding to the address is filled into instruction memory 202 indexed by the BNX, a new track corresponding to the block number is created in track table 204, such that the active list 404 can indicate the newly established track and the associated address. Therefore, the above explained operations of active list 404, and scanner 402 may be able to fill the instruction block corresponding to a branch target instruction of a branch point into instruction memory 202 in advance of the branch point is fetched and executed by CPU core 216.

Further, when instructions are being filled into instruction memory 202, the branch target addresses of all direct branch instructions (i.e. TYPE 2 and TYPE 3) are calculated as a summation of the address of the branch instruction and a branch offset of the branch target instruction. The branch target address is sent to active list 404 to match the block address part, and active list 404 may assign a BNX. The assigned BNX, together with the instruction type from scanner 402 and the offset (BNY), form the content of the track table entry of each branch instruction. The content is stored in the track table entry addressed by BNX and BNY the corresponding branch source.

For the indirect branch source (i.e. TYPE 4 and TYPE 5), when the indirect branch source is examined at the first time, a valid bit of track table entry corresponding to the indirect branch source is set to invalid. When read pointer 214 of the tracker 206 points to an indirect branch source entry and reads out invalid content of the entry, the branch target address of the indirect branch source is calculated by CPU core 216 and sent to selector 408 via bus 410. Selector 408 selects the branch target address and sends it to active list 404 to perform an address matching operation. Active list 404 outputs a matched or assigned BNX, and the block offset of the branch target address is used as BNY. The BNX and BNY are stored to the indirect branch source entry, and valid bit of the entry is valid.

When read pointer 214 of tracker 206 points to the entry of indirect branch source and reads out valid content of the entry, the BNX and BNY of the content of entry is potential addressing address of the branch target corresponding to the branch source in track table 204. Thus, based on the address, the branch target instruction and the single or plural following instructions are fetched in instruction memory 202 and provided for speculative execution of CPU core 216. A speculative execution signal that can be passed to next pipeline stage is added in various pipeline stages of the pipeline of CPU core to implement speculative execution/ normal execution. When the indirect branch target instruction and multiple following instructions are executed, the signal is set as speculative execution at the first pipeline stage for executing the instruction. The method compares the block address of active list 404 corresponding to BNX of the potential addressing address with the block address part of the calculated actual branch target address in CPU core 216.

If the comparison result is equal and a branch is taken, the following instruction to be executed may set the signal as normal execution, and a result of the speculative execution instruction is normally written back in the write back pipeline stage. Read pointer 214 continues to move forward from the current address. If the comparison result is not equal and a branch is taken, the actual branch target address calculated by CPU core 216 is sent to selector 408 via bus 410 and sent to active list 404 after it is selected by selector 408 to perform an address matching operation. Active list 404 outputs a matched or assigned BNX, and the block offset of the branch target address is used as BNY. The BNX and BNY are updated to the indirect branch source entry of track table. The read pointer moves forward from the new branch target. At the same time, based on an address containing BNX and BNY, the instruction is read out from instruction memory 202 for CPU core 216. The speculative execution signal is set as normal execution at the first stage of the instruction execution. The comparison result that is not equal is sent to pipeline write back stage, such that the speculative execution results are discarded and the results are not written back.

If a branch is not taken, read pointer 214 moves to the next sequential execution address of the branch source.

During operation, because a total number of tracks in track table 204 may be limited, existing tracks may be replaced by new tracks. When determining which track is to be replaced, track table 204 may use, in general, a replacement policy like LRU or LFU to determine one track or more tracks to be replaced, which may also indicate that corresponding instruction/memory block in instruction memory 202 and entry in the active list 404 may also need to be updated or replaced.

However, when one memory block (and the corresponding track) is replaced by a new memory block/track, there may be other track having branch instructions with the replaced tracks as branch targets (the track contains the BNX of the replaced track). In this situation, after the replacement is taken place, the branch instruction with the replaced tracks as branch targets can branch to different instruction block and thus cause errors. Certain mechanisms may be implemented to prevent such errors from happening. For example, when the replacement is taken place, the valid bit of the branch source entry is set to invalid.

When read pointer 214 of tracker 206 points to a direct branch source entry (i.e. TYPE 2 and TYPE 3) and reads out the valid bit of the content of the entry is invalid, according to BNX and BNY of the branch source, the branch offset of the corresponding instruction read out from instruction memory 202, with the corresponding block address read out from active list 404 by BNX of branch source, as well as BNY of branch source (block offset) together are sent to the adder 406. The branch target address of the branch source is calculated by the sum of the three values and sent to selector 408 via bus 412. After the address is selected by selector 408, the address is sent to active list 404 to perform an address matching operation. Active list 404 outputs a matched or assigned BNX, and the block offset of the branch target address is BNY. The BNX and BNY are updated to the branch source entry, and the valid bit of the entry is set to valid.

When the address matching operation is unsuccessful in active list 404, based on the assigned BNX, the corresponding instruction block can be filled into the corresponding position of instruction memory 202. This operation is the same as the operation described in the previous embodiments, which are not be repeated here.

Thus, the adjacent next instruction address information of the branch source, the branch target instruction and the branch source address can be determined in advance. Before CPU core 216 executes the branch source, the corresponding branch target instruction and the next instruction are stored in instruction memory 202. An instruction memory with dual addressing and dual output port can simultaneously provide the corresponding branch target instruction and a next instruction following the branch instruction in a program sequence, as well as their respective following instructions for CPU core 216. Base on a branch decision executed by CPU core 216, before the branch instruction is processed to reach the execution stage in the pipeline, the method selects at least one of the branch target instruction and the next instruction following the branch instruction in a program sequence as a proper instruction to be executed by an execution unit, such that the pipeline operation is not stalled whether or not a branch is taken with respect to the branch instruction.

The dual addressing and dual output function may also be implemented by an instruction read buffer combined with single-port instruction memory. Tracker 206 can also be modified to provide the branch target instruction and the next instruction following the branch instruction in a program sequence, as well as their respective following instructions.

FIG. 5A illustrates an exemplary branch processing system consistent with the disclosed embodiment. As shown in FIG. 5A, comparing to tracker 206 shown in FIG. 2, a selector 504 and a register 508 are added in tracker 506. Register 508 stores an address of a next instruction of the branch source in case the read pointer that moves to the branch target address may return and point to the instruction. Incrementer 210 may increment the branch target address to read out a following instruction, providing addresses to fetch the branch target instruction and the following instruction from instruction memory 202. Selector 504 selects one from addressing address of the next instruction of the branch source and an incremented branch target address stored in register 508 and sends the selected result to selector 208. Selector 208 select one from the address sent from selector 504 and the content of the entry sent from the track table 204 and sends the selected result to register 212.

An instruction read buffer 502 that can store a memory block together with instruction memory 202 can provide next instruction of conditional branch source address and the branch target instruction. Based on block offset 218 of PC generated by CPU core 216, the following instruction of the instruction source may be fetched from instruction read buffer 502. Based on the read pointer of tracker 506, the branch target instruction and the following instruction are read out from instruction memory 202.

The branch decision stage 526 of CPU core 216 is usually in the middle stage of the CPU core pipeline. The pipeline stage before the decision stage is named as a front-end pipeline. The pipeline stage after the decision stage is named as a back-end pipeline. If CPU core 216 has two front-end pipelines, the two front-end pipelines together with two instruction streams achieve a non-punishment branch. The front-end pipeline connected with instruction read buffer 502 is named as next pipeline 520. The front-end pipeline connected with instruction memory is named as target pipeline 522. The branch decision instruction stage selects one output from the next pipeline and the target pipeline for execution pipeline 528 to continue process the instruction.

FIG. 5B illustrates an exemplary branch processing system operation consistent with the disclosed embodiments. As shown in FIG. 5B, branch processing system may include three tracks of track table 204, the memory 202 corresponding to the three tracks and the instruction block of instruction read buffer 502.

At the beginning, read pointer 214 points to No. 5 track, and a content of the corresponding No. 5 memory block is filled in instruction read buffer 502. Read pointer 214 moves from entry 562 of No. 5 track (to the right), and block offset 218 of PC generated by CPU core 216 sequentially fetches instructions of instruction read buffer 502 from instruction 572 as an instruction stream sent to next pipeline 520 of CPU core 216. When the read pointer moves to conditional branch instruction entry 564 corresponding to instruction 574 in the read buffer, the difference from the previous described example is that output of the decoder controls the process that register 508 stores the output of incrementer 210 (the value is information of a following address next to branch source address 564), the output of the decoder also controls selector 208 to select target address information 224 of track table 204 and controls the process that register 212 updates read pointer to point to entry 570 of No. 9 track. While the read pointer also reads out instruction 580 corresponding to entry 570 from instruction memory 202 and sends instruction 580 to target pipeline 522 of CPU core 216.

When entry 570 represents a non-branch instruction, the output of the decoder controls selector 504 and selector 208 to select the output of incrementer 210 and updates register 212 to add the read pointer by 1 along No. 9 track, thereby the pointer pointing to an entry on the right of entry 570. At this time, the read pointer also points to a following instruction of instruction 580 of instruction memory 202 and sends the following instruction to target pipeline 522 of CPU core 216. Read pointer 214 moves forward until CPU core 216 provides a feedback signal to inform that various levels of pipelines of target pipeline of the tracker are filled or reach the next branch source. Branch decision stage 526 of CPU core 216 determines whether the instruction is a branch instruction when conditional branch instruction 574 through next pipeline 520 reaches branch decision stage.

If branch decision stage 526 determines that the instruction is a non-branch instruction, the branch decision stage 526 continues to select the following instruction stream of the instruction 574 from next pipeline 520 for execution pipeline 528, that is, the pipeline operation is not stalled. The non-branch decision via TAKEN signal='0' feeds back to selector 504 and selector 208 controlled by the tracker to select a value stored in register 508 and updates register 212 using the selected value. At this time, read pointer returns from No. 9 track to an entry next to entry 564 of No. 5 track. The read pointer moves forward along No. 5 track until the read pointer reaches the conditional branch instruction of entry 566.

At this time, the output of the decoder controls the process that register 508 stores the output of incrementer 210 (the value is address information of a following address next to branch source address 566), the output of the decoder also controls selector 208 to select the target address information 224 from track table 204 and controls register 212 to update the read pointer to point to entry 568 of No. 2 track. At the same time, the read pointer reads out instruction 578 corresponding to entry 568 from instruction memory 202 and sends instruction 578 to target pipeline of CPU core 216. Read pointer 214 moves along No. 2 track until various levels of pipelines of target pipeline of the tracker are filled by instruction 578 and the following instructions. At the same time, the next pipeline continues to process instructions from instruction read buffer 502 including instruction 576 and the following instructions. Branch decision stage 526 determines whether the instruction is a branch instruction when the 576 instruction through next pipeline 520 reaches branch decision stage 526.

If branch decision stage 526 determines that the instruction is a branch instruction, the branch decision stage 526 selects instruction 578 and the following instruction stream from target pipeline 522 for execution pipeline 528. At this time, the branch decision via TAKEN signal='1' feeds back to selector 504 and selector 208 controlled by the tracker to select the output of incrementer 210 and update register 212 by the output of incrementer 210. Read pointer 214 continues to move along the 2nd track from the stop point. TAKEN signal='1' also controls the process that No. 2 memory block pointed to by the read pointer is filled into instruction read buffer 502 from the instruction memory, making No. 2 block as a new current memory block. Block offset 218 of PC generated by CPU core 216 fetches instructions of the current memory block from instruction read buffer 502 to the next pipeline 520 in demand.

At the same time, if read pointer 214 reaches a new conditional branch source entry 586 along No. 2 track and jumps to a new branch track, then read pointer 214 reads out the corresponding branch target instruction and the following instruction stream from instruction memory 202 and sends the corresponding branch target instruction and the following instruction stream to target pipeline 522. When a new instruction of next pipeline 520 from the new current memory block (No. 2 memory block) reaches branch decision stage 526, CPU core 216 selects the instruction stream from next pipeline 520 and sends the instruction stream to execution pipeline 528. Thus, the new branch target instruction and the following instructions are filled in target pipeline and waits for execution. Again and again, the pipeline operation is not stalled whether or not a branch is taken with respect to the branch instruction.

In addition, register 508 may store No. S address information after the branch source address (i.e. branch source address+S), where S is a depth of front-end pipeline. When the branch is not taken, the read pointer can be directly returned to the entry corresponding to the instruction being fetched by PC without catching PC.

If branch decision stage 526 determines that all the branch instructions of No. 5 track are non-branch instruction and read pointer 214 reaches an end entry, a next BNX of the memory block (No. 8 memory block) of the content of the end entry point is read out and sent to instruction memory 202 via read pointer 214. The next memory block is read out and stored in instruction read buffer 502 for CPU core 216. When the memory block is read out from the instruction memory and stored into the read buffer, only BNX of the read pointer is used. When the branch target instruction and the following instruction are read out and sent to target pipeline 522 of CPU core 216, both BNX and BNY of the read pointer are used.

FIG. 6 illustrates another exemplary branch processing system consistent with the disclosed embodiments. As shown in FIG. 6, comparing to FIG. 5A, the branch processing system adds a register 632, a register 636, a monitor that monitors block offset 218 of PC (not shown in FIG. 6), a selector 634, and a selector 638. The register 636 stores a block number of a memory block (a current memory block) stored in instruction read buffer 502. The register 632 stores a block number of the next memory block of a memory block (current memory block) stored in instruction read buffer 502. Selector 634 selects the block number of the next memory block or the block number of the branch target memory block to update register 636. The register 508 is not included in tracker 506.

Selector 504 in the tracker is used to select the following address of an instruction source including the current memory block number from register 636 and block offset 218 of PC or an incremented branch target address and sends the address to selector 208. Selector 208 still selects one of the address from selector 504 and the content of entry from track table 204 and sends the selected result to register 212. Selector 638 selects read pointer 214 (branch target address) provided by tracker 206 or the following memory block number selected by register 634 and send the selected result to the instruction memory to fetch the next memory block. Furthermore, the end entry of the track pointed to by BNX of read pointer 214 can be individually read out in the track table.

Returning to FIG. 5B, the next track of No. 5 track is No. 8 track in order. The next memory block of No. 5 memory block is No. 8 memory block in order. At the beginning, read pointer 214 locates at the position between entry 564 and entry 566 of No. 5 track. The next track number (No. 8) included in the end entry of No. 5 track is read out and stored in register 632. The content of the corresponding No. 5 memory block is filled in instruction read buffer 502. The corresponding memory block number BNX (No. 5) is also stored in register 636.

Read pointer 214 moves along the No. 5 track until read pointer 214 reaches a conditional branch instruction entry 566. At this time, the output of the decoder controls selector 208 to select target address information 224 from track table 204 and controls register 212 to update read pointer 214 to point to entry 568 of No. 2 track.

At the same time, selector 638 selects instruction 578 which is read out from instruction memory 202 and corresponds to entry 568 via read pointer 214 and sends instruction 578 to the target pipeline of CPU core 216. Read pointer 214 moves along No. 2 track until all levels of the target pipeline are filled with instruction 578 and the following instructions.

At the same time, next pipeline 520 continues to process instructions including instruction 576 and the following instructions from instruction read buffer 502. When branch instruction 576 through next pipeline 520 reaches branch decision stage 526, branch decision stage 526 determines whether the instruction is a branch instruction.

If branch decision stage 526 determines that the instruction is a branch instruction, branch decision stage 526 selects 578 instruction and following instruction stream from target pipeline 522 for execution pipeline 528, such that the pipeline operation is not stalled. At this time, TAKEN signal='1' controls selector 504 and selector 208 to select the output of incrementer 210 and update register 212 using the output of incrementer 210. Read pointer 214 continues to move along No. 2 track from the stop point. TAKEN signal='1' also controls selector 638 to select read pointer 214 of addressing No. 2 memory block containing the branch target instruction from the instruction memory filled to instruction read buffer 502. TAKEN signal='1' also controls the selector 634 to select BNX of No. 2 track of read pointer 214 and stores the BNX in register 636.

The block offset 218 of PC generated by CPU core 216 fetches instructions of the current memory block (No. 2 memory block) from instruction read buffer 502 to next pipeline 520 as needed. At the same time, if read pointer 214 reaches a new conditional branch source entry 586 along No. 2 track and jumps to a new branch track containing conditional branch source entry 586, read pointer 214 reads out the corresponding branch target instruction and the following instruction stream from instruction memory 202 and sends the corresponding branch target instruction and the following instruction stream to target pipeline 522. When a new instruction of next pipeline 520 from the new current memory block (No. 2 memory block) reaches branch decision stage 526, CPU core 216 selects the instruction stream from next pipeline 520 and sends the instruction stream to execution pipeline 528. The new branch target instruction and the following instructions are filled in target pipeline 522 and waits for execution.

When branch decision stage 526 determines that branch instruction 576 is not a branch instruction, branch decision stage 526 continues to select following instruction stream of instruction 576 from next pipeline 520 for execution pipeline 528. The pipeline operation is not stalled.

The non-branch decision via TAKEN signal='0' feeds back to selector 504 and selector 208 controlled by the tracker to select a current track number (BNX) stored in register 636 and block offset 218 of PC (BNY) generated by CPU core 216 and updates register 212 by using the BNX and BNY. At this time, read pointer 214 returns to the entry of the instruction being executed by CPU core 216 on the right of branch source 566 of No. 5 track from No. 2 track. Read pointer 214 moves along No. 5th track until read pointer 214 reaches the next branch source.

When CPU core 216 executes the last one instruction of No. 5 memory block, CPU core 216 automatically executes the instructions of the following memory block next cycle. Specially, when the monitor detects block offset 218 of PC reaches the highest address (e.g., all '1'), the monitor controls selector 638 to select a next memory block number (No. 8) of register 632 in order and sends the next memory block number to instruction memory 202 to fetch the corresponding memory block into the instruction buffer 502. Block offset 218 of PC fetches sequentially instructions from the lowest address of the instruction buffer and send the fetched instructions to next pipeline 520. At the same time, the monitor also selects the block number (No. 8) of register 632 into the register 636 as the current memory block number.

At this time, if branch decision stage 526 determines that branch instruction 576 is not a branch instruction (BRANCH='1', TAKEN='0'), the logic condition controls selector 646 and selector 208 to select the BNX (No. 8) of register 636 and block offset 218 of PC to update register 212, making read pointer 214 point to the entry corresponding to the currently being executed instruction. Read pointer 214 moves from the entry.

If branch decision stage 526 determines that branch instruction 576 is a branch instruction (BRANCH='1', TAKEN='1'), the logic condition controls selector 638 to select read pointer 214 (at this time, read pointer 214 points to No. 2 memory block) of reading out No. 2 memory block from instruction memory 202 into instruction read buffer 502 via block offset 218 of PC to next pipeline 520. The logic condition also controls selector 634 to select BNX (No. 2) of read pointer 214 to update register 636. Read pointer 214 moves on from the current position (No. 2 track). Again, the pipeline operation is not stalled, whether or not an instruction is a branch instruction.

Further, the instruction type supported by CPU core 216 may also include a function call instruction type and a function return instruction type. In this case, a stack may be added in tracker 206. The stack is used to store BNX and BNY corresponding to an address returned by the corresponding function when examining or executing the function call instruction.

FIG. 7A illustrates an exemplary tracker consistent with disclosed embodiments. As shown in FIG. 7A, a register set 702 with a last-in-first-out (LIFO) structure that performs stack operations is added in the tracker 206. When the function call instruction is examined or executed, the entry address (BNX and BNY) of track table 204 corresponding to the address returned by the function is pushed to register set 702. When the function return instruction is examined or executed, the entry address (BNX and BNY) of track table 204 corresponding to the address returned by the function may be directly popped from register set 702 (that is, the last entry address stored in register set 702 is popped) and sent to selector 208 via bus 704. Selector 208 selects bus 704 among an address from incrementer 210, an address via bus 704 and an address from track table 204 via bus 224 (i.e. a content of the entry in track table 204) and updates register 212.

At this time, read pointer 214 points to the track table entry corresponding to the address returned by the function and the instruction in the memory. CPU core 216 executes an instruction from the instruction of the memory pointed to by read pointer 214. Read pointer 214 moves on from the track table entry corresponding to the address returned by the function.

FIG. 7B illustrates another exemplary tracker consistent with disclosed embodiments. As shown in FIG. 7B, a register set 702 that performs stack operations is added in tracker 606.

When the function call instruction is examined or executed, the entry address (BNX and BNY) of track table 204 corresponding to the address returned by the function is pushed to register set 702. When the function return instruction is examined or executed, the entry address (BNX and BNY) of track table 204 corresponding to the address returned by the function may be directly popped from register set 702 (that is, the last entry address stored in register set 702 is popped) and sent to selector 208 via bus 704. Selector 208 selects bus 704 among an address from incrementer 210, an address from selector 504, an address via bus 704 and an address from track table 204 via bus 224 (i.e. content of the entry in track table 204) and updates register 212.

At this time, read pointer 214 points to the track table entry corresponding to the address returned by the function and the instruction of the memory. CPU core 216 executes an instruction from the instruction of the memory pointed to by read pointer 214. Read pointer 214 moves on from the track table entry corresponding to the address returned by the function.

The embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed systems and methods may provide fundamental solutions to processing branch instructions for pipelined processors. The disclosed systems and methods obtain addresses of branch target instructions in advance of execution of corresponding branch points and use various branch decision logic arrangements to eliminate the efficiency-loss due to incorrectly predicted branch decisions.

The disclosed devices and methods may also be used in various processor-related applications, such as general processors, special-purpose processors, system-on-chip (SOC) applications, application specific IC (ASIC) applications, and other computing systems. For example, the disclosed devices and methods may be used in high performance processors to improve pipeline efficiency as well as overall system efficiency.

Sequence Listing Free Text
Sequence List Text

The invention claimed is:

1. A branch processing method for controlling a pipeline operation of a processor, comprising:
determining an instruction type of an instruction written into a cache memory and recording the instruction type;
when the instruction is a branch instruction, calculating a branch target instruction address of the branch instruction and recording target address information corresponding to the branch target instruction address, wherein the target address information corresponds to one instruction segment containing at least the branch target instruction; and
when the branch target instruction is not stored in the cache memory, based on the branch target instruction address, filling the instruction segment containing at least the branch target instruction into the position corresponding to the target address information in the cache memory, such that, before a CPU core executes the branch instruction, a next instruction following the branch instruction in a program sequence and the branch target instruction of the branch instruction are stored in the cache memory,
wherein:
every instruction in the cache memory has one instruction type and one target address information corresponding to the instruction;
the instruction type includes a function call instruction and a function return instruction; and
when the CPU core executes the function call instruction, pushing target address information corresponding to an address returned by the function to a stack, wherein the target address information is one of the address information corresponding to the function call instruction and the address information of a next instruction following the function call instruction.

2. The method according to claim 1, wherein:
the instruction type includes a conditional branch instruction.

3. The method according to claim 1, wherein:
the instruction type includes an unconditional branch instruction.

4. The method according to claim 1, wherein:
the instruction type includes a non-branch instruction.

5. The method according to claim 1, wherein:
every instruction in the cache memory has a corresponding valid bit, wherein the valid bit represents whether the corresponding target address information is valid.

6. The method according to claim 5, wherein:
when the instruction segment corresponding to the target address information is replaced from the cache memory, the valid bit corresponding to the target address information is set to invalid.

7. The method according to claim 6, further including:
when the valid bit corresponding to the branch instruction to be executed by the CPU core is invalid, recalculating the branch target instruction address of the branch instruction and recording the target address information corresponding to the branch target instruction address.

8. The method according to claim 7, further including:
when the branch target instruction is not stored in the cache memory, based on the branch target instruction, filling the instruction segment containing at least the branch target instruction into the position corresponding to the target address information which corresponds to the branch instruction in the cache memory, such that before a CPU core executes the branch instruction, the next instruction following the branch instruction in the program sequence and the branch target instruction of the branch instruction are stored in the cache memory.

9. The method according to claim 5, further including:
when the branch instruction to be executed by the CPU core is an indirect branch instruction and the corresponding valid bit is valid, before the CPU core calculates and obtains the branch target address, speculatively executing a following instruction of the indirect branch instruction, wherein the target address information corresponding to the indirect branch instruction is used as a position of the following instruction, such that the pipeline operation is not stalled due to the indirect branch instruction.

10. The method according to claim 9, further including:
after the CPU core calculates and obtains the indirect branch target address, comparing the branch target address with the branch target address corresponding to the target address information corresponding to the indirect branch instruction;
based on a comparison result, determining following operations.

11. The method according to claim 10, wherein:
when the comparison result is not equal and a branch is taken, the obtained actual branch target address calculated by the CPU core is the following instruction address of the indirect branch instruction.

12. The method according to claim 11, further including:
recording target address information corresponding to the branch target address, wherein the target address information corresponds to one instruction segment containing at least the branch target instruction; and
when the branch target instruction is not stored in the cache memory, based on the branch target instruction address, filling the instruction segment containing at least the branch target instruction into the position corresponding to the target address information in the cache memory.

13. The method according to claim 1, further including:
providing both a branch target instruction of the branch instruction and the next instruction following the branch instruction in the program sequence from the cache memory for the CPU core;
determining a branch decision with respect to the branch instruction; and
selecting at least one of the branch target instruction and the next instruction as a proper instruction to be executed by an execution unit of the processor, based on the branch decision and before the branch instruction is executed by the execution unit, such that the pipeline operation is not stalled whether or not a branch is taken with respect to the branch instruction.

14. The method according to claim 13, further including:
incrementing target address information corresponding to the branch instruction to provide an addressing address of an address segment including the branch target instruction in the cache memory; and
when this branch is taken successfully, using the incremented target address information as a new addressing address for a following operation.

15. The method according to claim 14, further including:
recording position information of the next instruction following the branch instruction in the program sequence;

incrementing the branch instruction address to provide the addressing address of the address segment including the branch target instruction in the cache memory; and when this branch is taken unsuccessfully, using the address information of the incremented address as a new addressing address for a following operation.

16. The method according to claim 15, further including:

when the incremented branch instruction address reaches a last instruction of the instruction segment, continuing to increment the address to point to an instruction of a next instruction segment following the address of the instruction segment; and using the address information of the incremented address as a new addressing address for a following operation.

17. The method according to claim 16, further including:

based on the branch decision, when this branch is taken unsuccessfully, discarding the address information obtained by incrementing the branch target address; and using the address information obtained by incrementing the branch instruction address as a new addressing address.

18. The method according to claim 1, further including:

when the CPU core executes the function return instruction, popping the target address information from the top of the stack as target address information of the function return instruction;

recording the target address information of the function return instruction, wherein the target address information corresponds to one instruction segment containing at least the branch target instruction; and when the target instruction is not stored in the cache memory, based on the target instruction address corresponding to the target address information, filling the instruction segment containing at least the target instruction into the position corresponding to the target address information in the cache memory, such that before the CPU core executes the function return instruction, the target instruction of the function return instruction are stored in the cache memory.

19. A branch processing system for controlling a pipeline operation of a processor, comprising:

a scanner configured to determine instruction type of an instruction written into a cache memory and calculate a branch target instruction address of the branch instruction;

an active list configured to convert the branch target instruction address to the target address information;

a track table configured to record the instruction type and the target address information corresponding to the instruction written into the cache memory; and when the branch target instruction is not stored in the cache memory, based on the branch target instruction address, filling the instruction segment containing at least the branch target instruction into the position corresponding to the target address information in the cache memory, such that before a CPU core executes the branch instruction, a next instruction following the branch instruction in a program sequence and the branch target instruction of the branch instruction are stored in the cache memory, wherein every instruction segment in the cache memory corresponds to one table row in the track table; and every instruction in the cache memory corresponds to one table entry in the track table, wherein the instruction type stored in the track table includes a non-branch instruction, a function call instruction and a function return instruction.

20. The system according to claim 19, wherein:

the instruction type stored in the table entry includes a conditional branch instruction.

21. The system according to claim 19, wherein:

the instruction type stored in the table entry includes an unconditional branch instruction.

22. The system according to claim 19, wherein:

every table entry of the track table includes a valid bit, wherein the valid bit represents whether the target address information included in the table entry is valid.

23. The system according to claim 22, wherein:

the cache memory provides both the next instruction following the branch instruction in the program sequence and the branch target instruction of the branch instruction for the CPU core at the same time.

24. The system according to claim 22, further including:

a branch logic unit configured to determine a branch decision with respect to the branch instruction based on at least the address of the branch target instruction; and a select logic unit configured to select at least one of the branch target instruction and the next instruction as a proper instruction to be executed by an execution unit of the processor, based on the branch decision and before the branch instruction is executed by the execution unit, such that the pipeline operation is not stalled no matter whether a branch is taken with respect to the branch instruction.

25. The system according to claim 24, further including:

an incrementer configured to increment the branch instruction address information and the target address information corresponding to the branch instruction, providing an addressing address of an address segment including the branch instruction in the cache memory and an addressing address of an address segment including the branch target instruction in the cache memory;

a current address register configured to store the addressing address of the address segment including the branch instruction;

a target address register configured to store the addressing address of the address segment including the branch target instruction; and a selector configured to select one of the current address register and the target address register as a new addressing address, wherein:

when this branch is taken successfully, the selector selects the address information stored in the target address register; and when this branch taken is unsuccessfully, the selector selects the address information stored in the current address register.

26. The system according to claim 25, further including:

a segment end address register configured to store an addressing address of a next instruction segment following instruction segment address being executed by the CPU core; and a segment address selector configured to select one of the current address register and the segment end address register as a new addressing address, wherein:

when CPU core executes a last instruction of the instruction segment, the segment address selector selects the address information stored in the segment end address register; and when CPU core does not execute the last instruction of the instruction segment, the segment address selector selects the address information stored in the current address register.

27. The system according to claim 19, further including:

a stack configured to store address information corresponding to function return address of the function call instruction;

when the CPU core executes the function call instruction, pushing target address information corresponding to an address returned by the function to the stack;

when the CPU core executes the function return instruction, popping the target address information from the top of the stack as target address information of the function return instruction;

storing the target address information of the function return instruction in the table entry of the track table corresponding to the function return instruction, wherein the target address information corresponds to one instruction segment containing at least the branch target instruction; and when the target instruction is not stored in the cache memory, based on the target instruction address corresponding to the target address information, filling the instruction segment containing at least the target instruction into the position corresponding to the target address information in the cache memory, such that before the CPU core executes the function return instruction, the target instruction of the function return instruction is stored in the cache memory.

28. The system according to claim 26, wherein:

the CPU core has two front-end pipelines that execute the next instruction following the branch instruction in the program sequence and the branch target instruction of the branch instruction, respectively; and a branch decision stage of the CPU core selects an output of one of the two front-end pipelines for a back-end pipeline to continue processing instructions.

* * * * *